United States Patent

Friske et al.

[11] Patent Number: 5,364,487
[45] Date of Patent: Nov. 15, 1994

[54] GLASS-PLASTIC COMPOSITE

[75] Inventors: Mark S. Friske, Campbell, N.Y.;
Ronald E. Johnson, Tioga, Pa.;
Christine M. Reagan; Theresa A.
Winer, both of Corning, N.Y.;
Lung-Ming Wu, Horseheads, N.Y.

[73] Assignee: Corning Incorporated, Corning, N.Y.

[21] Appl. No.: 120,921

[22] Filed: Sep. 15, 1993

[51] Int. Cl.⁵ .......................... B32B 31/20; C09J 4/00
[52] U.S. Cl. ................................. 156/309.9; 156/106;
156/286; 156/322; 156/331.7
[58] Field of Search ................. 156/106, 212, 322, 99,
156/286, 309.9, 331.7; 351/166, 177; 428/425.6;
264/1.7

[56] References Cited

U.S. PATENT DOCUMENTS

| | | | |
|---|---|---|---|
| 3,657,057 | 5/1972 | Shorr et al. | 156/331.7 |
| 4,139,674 | 2/1979 | Muller et al. | 156/331.7 |
| 4,477,510 | 10/1984 | Johnson et al. | |
| 4,707,208 | 11/1987 | Crumbach et al. | 156/212 |
| 4,798,690 | 1/1989 | Levy | 156/106 |
| 4,865,668 | 9/1989 | Goepfert et al. | |
| 4,977,028 | 12/1990 | Goepfert et al. | |
| 5,073,423 | 12/1991 | Johnson et al. | |
| 5,104,474 | 4/1992 | Scola et al. | 156/286 |
| 5,232,637 | 8/1993 | Dasher et al. | |

FOREIGN PATENT DOCUMENTS 0077168  5/1982  European Pat. Off.

*Primary Examiner*—Michael Ball
*Assistant Examiner*—Richard Crispino
*Attorney, Agent, or Firm*—Milton M. Peterson; Clinton S. Janes, Jr.

[57] ABSTRACT

A method of applying a tough, abrasion-resistant, organic film to a back surface of a thin, glass body to form a glass-plastic composite, the method comprising preheating the film to a temperature at which residual solvent and moisture are removed from the film, preheating a presshead to a pressing temperature, pressing the film and the glass together, maintaining the glass-film assembly at a controlled temperature and pressure for a period of time to form a sealed composite body, and cooling the sealed body to solidify the glass-plastic composite.

27 Claims, 2 Drawing Sheets

GLASS-PLASTIC COMPOSITE

FIELD OF THE INVENTION

Method of applying an organic film to a surface of a thin, glass body to form a glass-plastic composite, such as an ophthalmic lens.

BACKGROUND OF THE INVENTION

A major criticism of glass articles is based on weight. This is particularly true of ophthalmic lenses where comfort of the user is very important.

One approach to reducing the weight of glass lenses is to make the overall lens thinner. Most glass lenses, particularly those with a minus prescription, are about 2.2 mm. thick at the thinnest point on the lens. Reducing the lens thickness to 1.0 mm. at the thinnest point reduces the lens weight by up to 55%, depending upon the lens prescription. However, such a thin lens by itself may not meet the FDA requirements for impact resistance.

The weight disadvantage of glass has led to the advent of plastic lenses. However, plastic materials are generally less scratch resistant than glass. Also, plastic materials do not offer reliable photochromic characteristics.

A further criticism of glass arises from its brittle nature, and the potential danger created by glass shards when a glass article breaks. This problem has been countered in vehicle windshields by resorting to a laminated product having an inner plastic film or layer. In that product, glass shards tend to remain bonded to the plastic inner layer after fracture.

Numerous proposals have been made to produce a glass-plastic, composite, ophthalmic lens that combines a thin, glass lens member with a plastic film layer. The usual proposal for minimizing weight is to apply a plastic film on the back surface of a glass lens member. The front glass surface, where abrasion is most likely to occur, provides scratch resistance.

U.S. Pat. No. 5,073,423 (Johnson et al.) discloses a system by which thinner, lighter weight, ophthalmic lenses can be produced while still meeting the appropriate impact requirements. This approach involves pressing a tough, abrasion-resistant, polymeric film to the back surface of a finished lens. A mechanical presshead with a silicone applicator head is used for pressing. Heat may be used to improve adherence.

A tough, abrasion-resistant film, such as a polyurethane, applied and adhered to the back concave surface of a lens, restrains glass fragments from striking the wearer. In a manner similar to a laminated safety glass, or an automobile windshield, the film reduces the risk of glass fragments coming into contact with the wearer. Typically, most, if not all, of the glass fragments remain bonded to the film even when a glass lens component is fractured.

The method proposed in the Johnson et al. patent offers advantages over other possible techniques for applying a plastic film, such as autoclaving. The process is quite simple, and the cost of the equipment required is relatively small. Hence, the method is well adapted to optical lab practice because the composite lens can be produced on-site, and a relatively small capital investment is required.

However, when attempts were made to implement the procedure of the Johnson et al. patent, certain problems were encountered. In particular, optical defects occurred in the film; also, problems with optical quality, and with film adhesion, occurred in changing from production of one lens prescription to another. The present invention represents an improved method that is designed to avoid, or correct, the indicated problems.

SUMMARY OF THE INVENTION

The invention resides in a method of adhering a tough, abrasion-resistant, adhesive, organic film to the back surface of a thin, glass body wherein the film and the glass body are positioned adjacent each other and are pressed together to adhere the film to the glass, the improvement comprising preheating the film to a temperature at which residual solvent and/or moisture are removed from the film, preheating a presshead to facilitate heat control during pressing, pressing the film and the glass body together to form a glass-plastic composite, maintaining the composite at controlled temperature and pressure conditions for a period of time to wet the glass surface with the organic adhesive, and cooling the composite to solidify the organic and adhere it to the glass surface.

PRIOR ART

In addition to the Johnson et al. patent described above, attention is directed to the following patent literature:

U.S. Pat. No. 4,447,510 (Johnson et al.) discloses a heat release decal for decorating a shaped surface of an article. The decal includes a web, a release layer, and a design layer, each of which is stretchable.

U.S. Pat. No. 4,865,668 and U.S. Pat. No. 4,977,028 (Goepfert et al.) describe production of laminated, transparent, polarizing glass articles wherein a continuous, optically transparent, composite, polyurethane film is applied over, and bonded to, a polarizing glass lens.

European Patent Publication No. 0,077,168 (Bognar et al.) describes a method for making a laminated, ophthalmic lens assembly utilizing the method disclosed in the Goepfert et al. patents, supra.

These patents do not disclose the problems solved by, or the conditions necessary for, the present invention.

U.S. Pat. No. 5,232,637 (Dasher et al.) describes a method of producing a glass-plastic, laminated, ophthalmic lens structure that includes a step of pressing a thin, adhesive layer of thermoplastic urethane against a heated glass lens. The film applied is not an abrasion-resistant, protective film.

U.S. Pat. application Ser. No. 08/002,058 was filed Mar. 1, 1993 in the name of J. Donohoe and assigned to the same assignee as the present application. The Donohoe application describes a method and apparatus for transfer and application of an offset, heat release decal to an article surface. A supported, heated, silicone membrane is employed in conjunction with a presshead to pick up a decal and bring it into contact with an article surface. An ink pattern, not a protective film, is applied to the glass surface.

DESCRIPTION OF THE INVENTION

The invention is basically concerned with an improved method of producing a glass-plastic composite body. The composite body may find use in different applications, and may take a variety of different forms. However, an application of immediate interest is a glass-plastic, ophthalmic lens, and the invention is hereafter described with reference to such application.

Figure 1:
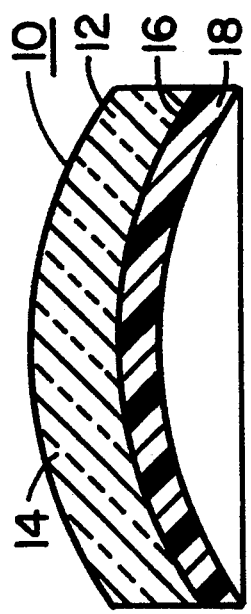
FIG. 1 is a side view in cross-section of a glass-plastic, ophthalmic lens structure with which the invention is concerned.

FIG. 1 is a side view in cross-section showing a typical lens construction 10 with which the invention is concerned. Lens 10 has a thin, glass lens member 12 having a front convex surface 14 and a back concave surface 16. Adhered to back surface 16 is an organic plastic layer 18.

The invention is based on improvements in the procedure of the Johnson et al. U.S. Pat. No. 5,073,423 described earlier. The invention arose from solving problems that were encountered in commercializing the product of the Johnson et al. patent.

The decal described in the patent embodied an abrasion-resistant, polyurethane film having a thickness of 0.002"–0.02" (0.05–0.5 mm). However, it was found desirable to utilize a film on the thick side, that is, a film having a thickness in the range of 0.010-0.020" (0.25-0.5 mm).

In order to conform a film of such thickness to a presshead during application, it was found necessary to preheat the film. Otherwise, the film did not stretch properly, and did not apply smoothly to the glass surface.

It was also observed that bubbles tended to occur in the applied film. The source of these bubbles was found to be volatiles, that is, residual solvent and/or moisture retained in the polyurethane film. These residual volatiles can be eliminated, and the bubble problem corrected, by holding the film at the preheat temperature for a period of time.

The preheat time-temperature cycle must be long enough, and high enough, to remove the volatile components from the film. The temperature must also be sufficiently high to impart the desired degree of flexibility to the film. However, the cycle, and particularly the temperature, will be limited by the need to avoid, or at least minimize, degradation of the film. We have found that these conditions can be met with a preheat time-temperature cycle of 100°–170° C. for a period of 1–6 minutes. We generally prefer a cycle of about 160° C. for a period of three minutes.

In order to achieve good wetting of the glass surface by the organic adhesive, it has been found desirable to maintain the glass-plastic assembly under press are for an extended time at an elevated temperature. The time, temperature, and pressure parameters are interdependent. They will also depend on the particular thermoplastic adhesive material formulation and its properties, such as melt point.

The critical factor, of course, is sufficient softening of the organic to wet the glass substrate. This produces a high adhesion level between glass and plastic when the assembly is cooled. The lens geometry, including lens diameter and thickness, as well as heat transfer of the glass, all contribute to optimum sealing conditions.

In general, sealing parameters may be a pressure of 10 to 54 psi (0.69 to 3.8 bars) for a time of 2 to 20 minutes with the temperature in the range of 100°–210° C. Our work indicates that optimum conditions depend on the nature of the lens being produced. Thus, at a pressure of 27.5 psi (1.9 bars), the preferred pressing time and temperature, for plus prescription lenses, plano prescription lenses, and minus prescription lenses up to −2 sphere and −2 cylinder power, are 190° C. and 5 minutes. However, for minus prescription lenses having more sphere or cylinder power than −2, a temperature of 195° C. for 12 minutes is preferred.

It is apparent then that it is desirable to also preheat the presshead in order to facilitate temperature control and reduce the pressing time. The preheat temperature is limited by the thermal stability of the presshead material. Conveniently, both time and temperature may be the same as for the film preheat. Accordingly, the temperature may be in the range of 100°–200° C. and the time not limited. We prefer a temperature of 190° C. for 3 minutes to coordinate with the pressing temperature, and with the film preheat conditions.

Once the glass surface is thoroughly wetted by the adhesive organic, the assembly is then cooled. Pressure is maintained until the glass-plastic composite completely solidifies. This temperature is dependent on the thermal characteristics of the thermoplastic adhesive, and will be no greater than 170° C. Typically, we cool to a temperature of about 145° C. before releasing pressure. The glass-plastic composite may then be removed from the apparatus and cooled to ambient. In the case of an ophthalmic lens, the article is typically allowed to set for at least 2 hours before further processing, such as edging and framing, although this is not critical.

The invention is further described with reference to the attached drawings.

Figure 2:
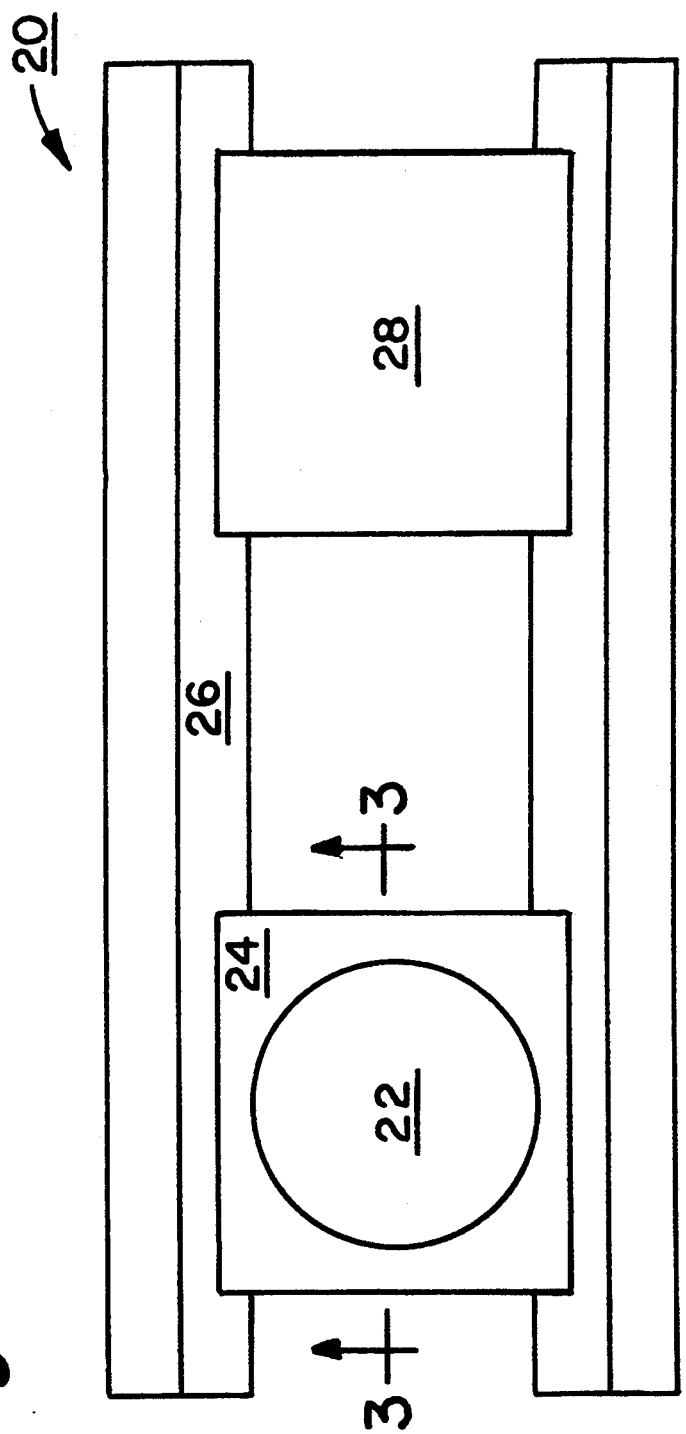
FIG. 2 is a top plan view of an arrangement for carrying out one preheating step of the inventive method.

FIG. 2 is a top plan view of an arrangement, generally designated 20, for heating an adhesive, organic film 22. Film 22 is preheated prior to applying it to a glass article, such as ophthalmic lens member 12. Film 22 may be a 0.015" (0.375 mm) thick, circular or square piece of thermoset polyurethane cut from an extruded or cast sheet of the film.

The invention is described with reference to our preferred material, polyurethane. However, it will be appreciated that other polymeric materials, such as polyvinyl butyral, may be substituted. Film 22 is secured to a carrier 24 by known means, such as clamping. Carrier 24 is shown mounted on a horizontal slide 26 which leads into oven 28. Carrier 24, with film 22, may be pushed into oven 28 to be preheated prior to its application to the concave surface of lens member 12.

Figure 3:
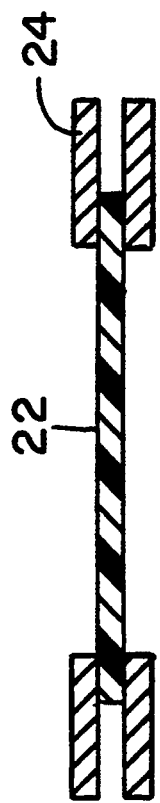
FIG. 3 is a view in cross-section taken along line 3—3 in FIG. 2.

FIG. 3 is a view in cross-section taken along line 3—3 in FIG. 2. It shows film 22 mounted in carrier 24. Film 22 is shown as a single plastic layer. However, the abrasion-resistant material of film 22 may not be inherently adhesive. This is the case with the cross-linked, thermoset polyurethane we use for film layer 22. In that event, it is necessary to apply a surface layer that can be rendered adherent. Such a layer is shown as adhesive layer 26 in FIG. 6.

Adhesive layer 26 may be a thermoplastic, polyurethane adhesive layer about 0.001" (0.025 mm) thick. It is so applied to film layer 22 that adhesive layer 26 will contact a glass surface, for example, the back surface on lens member 12, when the glass and plastic are assembled.

Figures 4, 5:
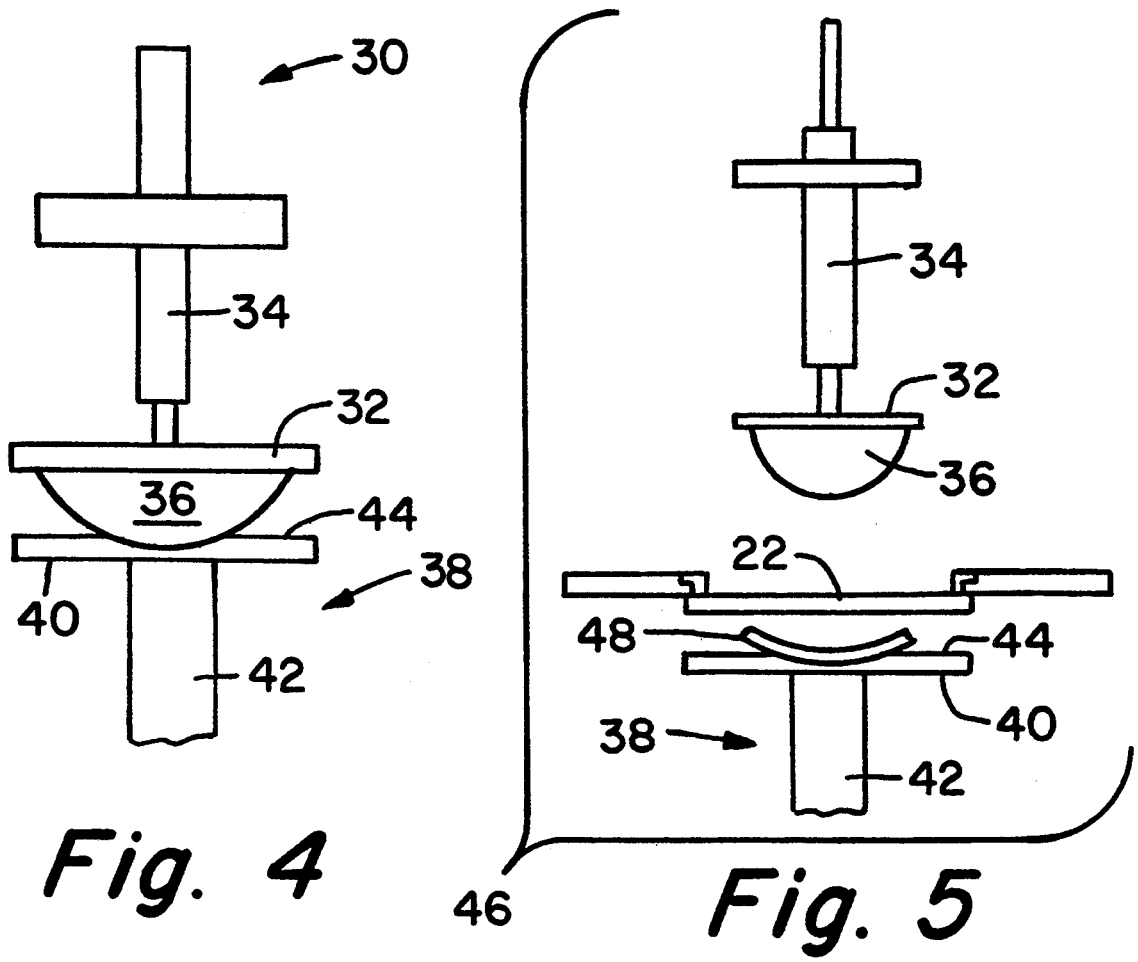
FIG. 4 is a schematic side view of an arrangement for carrying out a second preheating step of the inventive method.
FIG. 5 is a schematic side view depicting the forming of a composite in accordance with the invention.

FIG. 4 is a schematic side view of a presshead assembly 30 and a system, generally designated 38, for preheating the presshead. Presshead assembly 30 is a conventional component shown as having a cross arm construction for vertical operation. Alternatively, a plunger assembly, operated by a lever arrangement, might be employed.

Presshead assembly 30 has a thin plate, 32, carried by a vertical post 34. Plate 32 serves as a carrier for presshead 36. The latter is formed from an elastomeric material, preferably a deformable silicone.

System 38 comprises an elastomeric, base member 40 carried on a vertically movable, pneumatic cylinder 42. The upper surface 44 of base member 40 has a concave curvature similar to the convex surface 14 of lens 12. Base member 40 is heated by an electric coil embedded within, or bonded to, its upper surface 44.

For preheating, presshead 36 is lowered into close proximity to the upper surface 44 of base member 40. Thereby, it is preheated in accordance with a predetermined time-temperature cycle as described earlier.

FIG. 5 is a schematic side view illustrating a system 46 for carrying out the process of pressing organic film 22 to a glass article. System 46 brings together preheated film 22, preheated presshead 36 and heating system 38 for application of film 22 to a glass article 48. Article 48 is shown as an ophthalmic lens member that corresponds to member 12 of FIG. 1. In sealing system 46, system 38 of FIG. 4 is modified by raising preheated presshead 36 out of proximity to the upper surface 44 of electrically heated base member 40.

Optionally, a protective membrane, in the nature of a film, may be positioned between film 22 and presshead 36. This protective membrane serves to minimize distortion and avoid defects in the pressed lens product. It prevents any defects in the presshead from imparting optical or cosmetic defects to the pressed lens product. This is particularly true where it is necessary to process lenses of different sizes and shapes. In that case, the presshead may retain a memory of lens shape. It also prolongs presshead life by shielding the presshead from damage during pressing.

We contemplate the protective membrane being sacrificial, that is, being removed and discarded after one or more uses. Most organic sheet material, useful for film 22, is supplied with a protective film on both surfaces. This film may also be suitable as a protective membrane pressing. It is convenient then to strip the protective film from one surface of film 22, and to leave the protective film on the other surface as a membrane for pressing.

The protective membrane must be a material that does not adhere, or is removably adhered, to film 22. It must also be capable of withstanding the application temperatures for the length of time employed in pressing. Appropriate materials include polyolefins, polyesters, silicones and fluoropolymers. It is desirable that the protective membrane be no thicker than is necessary to prevent presshead distortions from being transmitted to film 22. We have found membranes in the thickness range of 0.002–0.010" (0.05–0.25 mm) to be effective. They should, of course, have an optical quality finish, at least on the face against film 22.

Where the protective membrane is provided on film 22, it is convenient to mount the membrane and film 22 together in support frame 24. However, there may be situations where it is desired to provide the protective membrane separate from film 22. In that case, the protective membrane may be mounted on a separate frame similar to frame 24.

Figure 6:
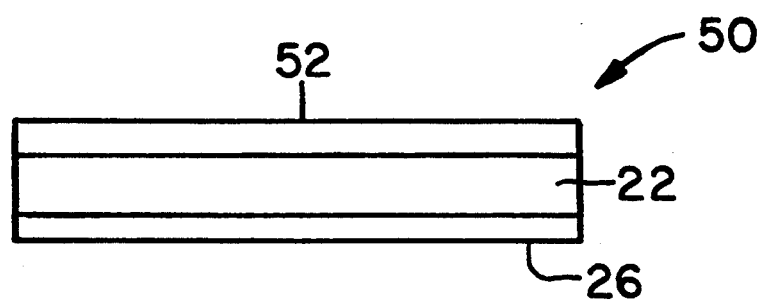
FIG. 6 is a side view in cross-section of a modified form of the film shown in FIG. 3.

FIG. 6 is a side view in cross-section of a preferred form of composite material 50 for providing film 22. As shown, composite 50 includes film 22 with protective membrane 52 on one face and adhesive layer 26 laminated to the opposite face. It will be appreciated that adhesive layer 26 will be pressed against a surface of lens 48 to form a seal. Subsequently, protective membrane 52 will be stripped off and discarded.

To initiate pressing operations, lens member 48 is positioned, with its concave surface up, on elastomeric base 40 that contains a temperature-controlled heating element. Film 22, in the form of composite 50 and framed in carrier 24, is positioned above lens member 48. Presshead 36 is lowered to a position such that the nose of presshead 36 is just above the surface of composite 50. Meanwhile, lens member 48 is raised to bring it into contact with composite 50 and presshead 36.

The assembly of lens member 48 and film 22 is subjected to a controlled pressure using a combination of pneumatic cylinder 42, operating against base 40, and presshead assembly 30. Presshead 36 has a curved cone shape so designed that the center, or nose, of the presshead will cause film 22 to make initial contact with the center of lens member 48, preferably the geometric center. Further contact spreads film 22 toward the edge of the lens. This prevents air entrapment between the lens member and the film.

The assembly is held under controlled pressure and temperature for a sufficient time to permit effective wetting of the glass to provide a good seal. With adhesive layer 26 provided on film 22, the time of holding is sufficient to permit total wetting of the glass by the molten adhesive layer 26. Typically, holding at a pressure of 27.5 psi (1.9 bars), and at a temperature of about 190° C., for a period of 5 minutes will suffice.

Following the sealing step, current flow to the heating element in base 40 is discontinued, and the composite is allowed to cool. Sealing pressure is maintained until the thermoplastic polyurethane adhesive solidifies. Typically, this occurs at about 145° C. Pressure is then released by lowering base 40, raising presshead 36, or both. The composite is then removed. In the case of a lens, the article may be set aside for 2 hours or more before further processing.

The composite will normally be inspected fur defects after removal from base 40 and cooling. A second inspection may occur after further processing, such as edging of a lens. It is a feature of the present invention that the glass-plastic lens, or other composite article, can be readily salvaged if defects are observed. For this purpose, the composite is immersed in boiling water for a period of about 15 minutes. This reduces the adhesion of the plastic to the glass to a sufficient degree that film 22 can be readily peeled from the glass surface.

Immediate interest is in lightweight, ophthalmic lenses for the consumer public. The relatively simple procedure for producing a composite lens permits an optometry shop to produce the lens on-site and without delay. Also, it permits customizing the lens. For example, the plastic film may be tinted, thus making available a variety of shades and colors. The film may be tinted as manufactured, or the finished lens assembly may be tinted after the sealing operation. Other possibilities include providing polarizing and/or UV-absorbing properties in either the plastic film, or as a separate coating on the glass.

It is further contemplated that the invention will find application in lighter weight, industrial safety glasses. These glasses have relatively thick, and hence uncomfortably heavy, lenses. This is necessary to meet strict impact resistance requirements. The potential exists then for a lighter weight, composite lens for this purpose.

While immediate interest centers in ophthalmic ware, it will be apparent that the method is applicable to other articles, such as sight glasses.

We claim:

1. A method of adhering a tough, abrasion-resistant, adhesive, organic film to the back surface of a thin, glass body wherein the film and the glass body are positioned adjacent each other and are pressed together to adhere the film to the glass and wherein the film contains volatile materials, the improvement comprising preheating the film to a temperature within the temperature range in which the volatile materials are volatile and for a period of time sufficient to eliminate the volatile materials from the film, preheating a presshead to facilitate heat control during pressing, pressing the film and the glass together to form a glass-plastic composite, the pressing step being performed at a pressure and an elevated temperature for an extended period of time to sufficiently soften the film to wet the glass surface with the organic adhesive and cooling the composite to the solidification temperature of the organic adhesive to solidify the organic adhesive and adhere it to the glass surface.

2. A method in accordance with claim 1 wherein the film is a polyurethane and is preheated to a temperature in the range of 100°–170° C. for a period of 1–6 minutes.

3. A method in accordance with claim 2 wherein the film is preheated to a temperature of about 160° C. for about 3 minutes.

4. A method in accordance with claim 1 wherein the presshead is preheated to a temperature in the range of 100°–200° C.

5. A method in accordance with claim 4 wherein the presshead is preheated to a temperature of about 190° C. for a period of about three minutes.

6. A method in accordance with claim 1 wherein the glass body is placed on a heated base that is vertically movable, and the glass body is raised while the preheated presshead is lowered against the film to press the film and glass together.

7. A method in accordance with claim 6 wherein the preheated film and glass are pressed together while maintained at a pressure of 10–54 psi (0.69–3.8 bars) and a temperature of 100°–210° C. for 2–20 minutes to provide wetting of the glass surface by the organic adhesive.

8. A method in accordance with claim 7 wherein the film and glass assembly is maintained at a pressure of about 27.5 psi (1.9 bars) and a temperature of about 190°–195° C. for a period of about 5–12 minutes.

9. A method in accordance with claim 6 wherein the composite is maintained under pressure while the composite is cooled to a temperature below its solidification temperature and thereafter releasing the pressure.

10. A method in accordance with claim 9 wherein the presshead is preheated to a temperature of about 190° C. for a period of about three minutes.

11. A method in accordance with claim 1 wherein the film is a thermoset polyurethane polymer having a thickness of 0.010–0.020″ (0.25–0.50 mm).

12. A method in accordance with claim 11 which further comprises applying a thermoplastic polyurethane, adhesive layer on the surface of the film facing the glass.

13. A method in accordance with claim 1 which further comprises positioning a protective membrane intermediate the film and the presshead prior to the pressing step.

14. A method in accordance with claim 13 wherein the protective membrane is removably adhered to the outer face of the film, and is removed after pressing.

15. A method of producing a lightweight, ophthalmic lens consisting essentially of a tough, abrasion-resistant, organic, adhesive film on the back surface of a thin glass lens member, wherein the film contains volatile materials, the method comprising preheating the film to a temperature within the temperature range in which the volatile materials are volatile and for a period of time sufficient to eliminate the volatile materials from the film, preheating a presshead to facilitate heat control during pressing, pressing the film and the glass together to form a glass-plastic composite, the pressing step being performed at a pressure and an elevated temperature for an extended period of time to sufficiently soften the film to wet the glass surface with the organic adhesive, and cooling the composite to the solidification temperature of the organic adhesive to solidify the organic adhesive and adhere it to the glass surface.

16. A method in accordance with claim 15 wherein the film is a thermoset polyurethane polymer having a thickness of 0.010–0.020″ (0.25–0.50 mm) and an adhesive layer applied over the surface facing the glass lens member.

17. A method in accordance with claim 16 wherein adhesive layer is a thermoplastic polyurethane.

18. A method in accordance with claim 15 wherein the film is a polyurethane and is preheated to a temperature in the range of 100°–170° C. for a period of 1–6 minutes.

19. A method in accordance with claim 18 wherein the film is preheated to a temperature of about 160° C. for about three minutes.

20. A method in accordance with claim 15 wherein the presshead is preheated to a temperature in the range of 100°–200° C.

21. A method in accordance with claim 15 wherein the glass lens member is placed on a heated base that is vertically movable, and the lens member is raised while the preheated presshead is lowered against the film to press the film and lens together.

22. A method in accordance with claim 21 wherein the preheated film and glass lens member are pressed together while maintained at a pressure of 10–54 psi (0.69–3.8 bars and a temperature of 100°–210° C. for 2–20 minutes to provide wetting of the glass lens surface by the organic adhesive.

23. A method in accordance with claim 22 wherein the film and glass lens member are maintained at a temperature of about 190° C. for about 5 minutes for a lens with a plus or plano prescription, or a minus prescription up to −2 sphere and −2 cylinder power, and at a temperature of about 195° C. for about 12 minutes for a minus prescription having more sphere or cylinder power than −2.

24. A method in accordance with claim 22 wherein the composite is maintained under pressure while the composite is cooled to a temperature below its solidification temperature and thereafter the pressure is released.

25. A method in accordance with claim 15 which further comprises positioning a protective membrane intermediate the film and the presshead prior to the pressing step.

26. A method in accordance with claim 25 wherein the protective membrane is removably adhered to the outer face of the film, and is removed after pressing.

27. A method in accordance with claim 15 which further comprises tinting the plastic film in the cooled composite.

* * * * *